E. K. ROOT.
Boring Gun Barrels.
No. 12,002.
Patented Nov. 28, 1854.
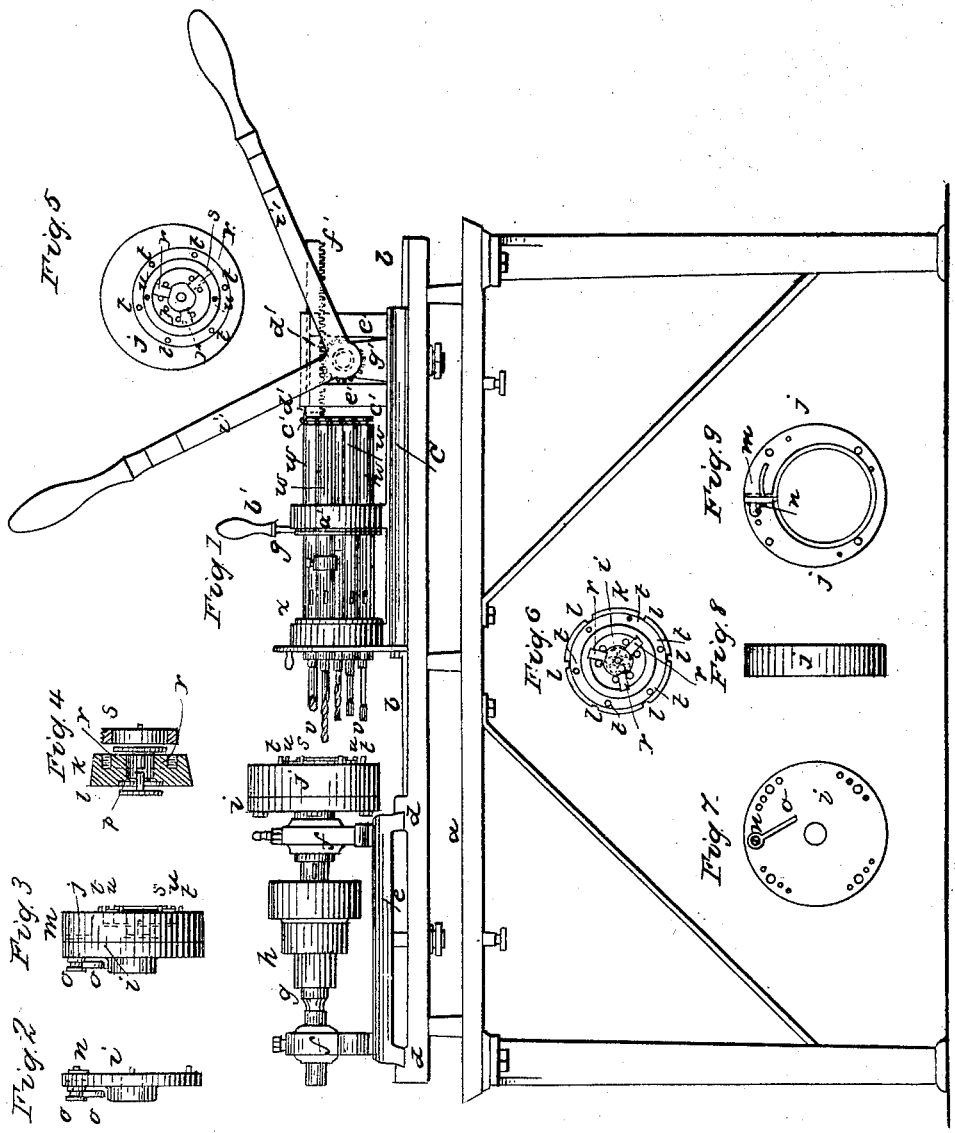
Witnesses
Rich. D. Hubbard.
Geo. G. Sill.
Inventor.
E. K. Root.

UNITED STATES PATENT OFFICE.

E. K. ROOT, OF HARTFORD, CONNECTICUT.

IMPROVED MACHINE FOR BORING THE CHAMBERS IN THE CYLINDERS OF FIRE-ARMS.

Specification forming part of Letters Patent No. 12,002, dated November 28, 1854.

*To all whom it may concern:*

Be it known that I, E. K. ROOT, of Hartford, Connecticut, have invented a Machine for Boring and Reaming the Calibers or Chambers in the Rotating Breech of Repeating Fire-Arms, which invention is applicable to other analogous purposes, of which the following is a full, clear, and exact description, reference being had to the accompanying drawings, making part of this specification, in which—

Figure 1 is an elevation of the machine, and Figs. 2, 3, 4, 5, 6, 7, 8, and 9 different views and sections of the chuck.

The same letters indicate like parts in all the figures.

The object of my invention is principally to drill and ream out the several calibers or chambers in the rotating many-chambered breech of fire-arms—such as Col. Colt's revolvers—by an organization of machinery by which the block of metal previously turned on the outside can be secured eccentrically in a chuck on a rotating mandrel, with the axis of the block of metal eccentric to the axis of rotation of the chuck, so that by turning the block of metal on the main part of the chuck the circle on which the several calibers or chambers are to be formed will travel in the line of the axis of rotation of the chuck, and thus in succession fix the axis of each caliber or chamber in the line of the said axis of rotation of the mandrel to drill and ream out the several chambers by simply presenting the tool in the said line as in central drilling and reaming in a lathe; and to this end my said invention consists in making a recess for the reception of the block of metal in a circular plate secured and adapted to turn in the main chuck, but eccentric to the axis of rotation of the chuck, the said eccentric block being provided with notches in its periphery to receive a securing-bolt or its equivalent to hold and secure it in any determined position in the main chuck, and also in providing the said eccentric plate with radial slides or followers, in combination with a ring tapped in an annular groove in the said eccentric plate, the inner periphery of the said ring being conical, so that by screwing it in and out its conical surface shall act on the followers to grip and liberate the block of metal; and my said invention also consists in combining the said chuck and mandrel with a series of sliding tool-carriers arranged in a circle, so that by turning the series each in succession can be brought in line with the axis of rotation of the mandrel.

In the accompanying drawings, $a$ represents a bench somewhat like a lathe-bench, with parallel V-shaped ways $b$, to which is fitted a slide $c$, with puppet-heads for carrying a series of boring and reaming instruments, to be presently described, and also transverse ways $d\ d$ at right angles to the ways $b$, to which is fitted another slide $e$, with puppet-heads $ff$ fitted with suitable boxes, in which is mounted a mandrel $g$, provided with a pulley $h$, in the manner of a turning-lathe, and carrying a chuck $i$ of peculiar construction. This chuck is fitted to the mandrel in the usual manner, and to the front face of it is secured a ring $j$, the outer periphery of which is concentric and the inner periphery eccentric and conical, with the larger diameter toward the plate of the chuck for the purpose of holding the part $k$ of the chuck, which is of corresponding form, so that it can turn freely in the said ring. The periphery of the turning part $k$ is formed with a series of notches $l$, one for each chamber of a rotating breech or other article to be bored, as represented at $i^2$, Fig. 6, and the ring $j$ is provided with a spring-bolt $m$, which slides radially to enter in succession the several notches $l$ to hold the turning part of the chuck in any one of the positions required. This bolt is operated by a tooth on a small arbor $n$, provided with a handle $o$, for the purpose of drawing it out of the notches. The part $k$ of the chuck has a central recess $p$, of the size required to receive the block of metal to be bored, and also radial grooves, to which are fitted radial slides $r$, which are operated to force them against the block to grip it centrally in the chuck by means of a concentric ring $s$, tapped into an annular groove cut in from the face of the chuck, by which it can be screwed in and out, and the inner periphery of this ring is slightly conical to act against the outer ends of the radial slides and force them inward to make them grip, so that by simply turning this ring the block of metal to be bored can be gripped and held or liberated at pleasure. The part $k$ of the chuck and the ring $s$ are each provided with projecting pins $t$ $u$, by which they can be turned.

The eccentricity of the part $k$ of the chuck and the parts within it must be such that the circle on which the series of holes $i^2$ are to be bored will, as the part $k$ is turned in the body of the chuck, pass in the line of the axis of the mandrel, so that by turning such part of the chuck with the block to be bored the axis of each hole to be bored will coincide with the axis of the mandrel. In this way the drilling or reaming motion can be given by the turning of the mandrel, as in boring a central hole in an ordinary central chuck. The number of notches in the periphery of the part $k$ and their distance apart must be regulated to suit the number of chambers or holes to be bored in the block and their relative distance apart.

The series of tools $v$—such as are usually employed for boring and reaming—are attached to one end of a series of cylindrical rods or tool-carriers $w$, arranged in a circle about a common center and adapted to slide in suitable holes in two heads $x$ $y$, each mounted in a puppet on the slide $c$ and adapted to turn therein, so as to bring successively each of the tools in a line with the axis of the mandrel. The heads with the tool-carriers are turned the required distance at each operation by means of a ratchet-collar $a'$ and handle $b'$ in manner well known to machinists, and which, therefore, does not require to be described. At the opposite end each tool-carrier $w$ has a groove $c'$, which, as the series is turned, locks into the end of a bar $d'$, adapted to slide in two puppets $e'$ $e'$, and provided with rack-teeth $f'$, which engage a pinion $g'$ on an arbor $h'$, provided with handles $i'$, by which the operative forces in succession each carrier with its tool toward the block of metal to be bored and reamed. So soon as one tool has been forced to the extent of its traverse it is drawn back, the series of carriers turned, which brings the next carrier in a line, and so on to the end of the series. This completes one chamber or bore. The part $k$ of the chuck is then turned or shifted one space to bring the next division of the block of metal in a line with the axis of the mandrel, and that is bored and reamed, and so on to the end of the series of chambers or bores to be drilled and reamed. In this way it will be seen that all the chambers for a rotating many-chambered breech for fire-arms will be made of uniform size, at equal distances apart, and at equal distances from the axis of rotation of the breech, so that when properly mounted in an arm the chambers will all in succession correspond with the barrel; and it will be obvious that my said invention is also applicable to other articles requiring to be bored at given and determined distances.

I do not wish to be understood as limiting myself to the special mode of forming and connecting the parts, so long as the same ends are attained by the mere substitution of equivalent means.

What I claim as my invention, and desire to secure by Letters Patent, is—

1. Forming the chuck with a circular eccentric plate having a recess to receive the block of metal to be drilled and reamed, or either, combined with the body of the chuck and with a bolt or its equivalent, substantially as specified, so that by turning the said eccentric plate on the body of the chuck the several holes to be drilled, bored, and reamed, or either, can be successively brought and held in line with the axis of rotation of the mandrel, as specified.

2. In combination with the said eccentric plate, of the chuck, the radial sliding grips operated by the conical surface of the screw-ring, substantially as specified, for holding and liberating the block of metal by simply turning the said ring, by means of which the block can at all times be held in the center of the eccentric plate, as specified.

3. The before-described eccentric chuck, in combination with the series of sliding tool-carriers arranged in a circle, substantially as specified, so that by turning the series the several tools can be brought successively in a line with the axis of the mandrel, as specified.

E. K. ROOT.

Witnesses:
 RICHARD D. HUBBARD,
 GEO. G. SILL.